United States Patent [19]

Gmelin et al.

[11] Patent Number: 5,228,888

[45] Date of Patent: Jul. 20, 1993

[54] ECONOMICAL AIR SEPARATOR

[75] Inventors: Robert Gmelin, Cranford; Alberto LaCava, South Plainfield, both of N.J.

[73] Assignee: The BOC Group, Inc., New Providence, N.J.

[21] Appl. No.: 850,640

[22] Filed: Mar. 13, 1992

Related U.S. Application Data

[63] Continuation-in-part of Ser. No. 498,078, Mar. 23, 1990, abandoned.

[51] Int. Cl.$^5$ .............................. B01D 53/04
[52] U.S. Cl. ........................ 55/25; 55/33; 55/62; 55/68; 55/74; 55/75
[58] Field of Search ............ 55/25, 26, 31, 33, 58, 55/62, 68, 74, 75, 161–163, 179, 180, 387, 389

[56]     References Cited
U.S. PATENT DOCUMENTS

| | | | |
|---|---|---|---|
| 3,182,435 | 5/1965 | Axt | 55/33 X |
| 3,313,092 | 4/1967 | Potts | 55/163 |
| 3,891,411 | 6/1975 | Meyer | 55/26 |
| 3,922,149 | 11/1975 | Ruder et al. | 55/25 X |
| 3,923,477 | 12/1975 | Armond et al. | 55/25 |
| 4,194,892 | 3/1980 | Jones et al. | 55/58 |
| 4,354,859 | 10/1982 | Keller, II et al. | 55/25 |
| 4,428,372 | 1/1984 | Beysel et al. | 55/25 X |
| 4,477,264 | 10/1984 | Kratz et al. | 55/25 |
| 4,534,346 | 8/1985 | Schlaechter | 55/25 X |
| 4,561,865 | 12/1985 | McCombs et al. | 55/25 |
| 4,572,723 | 2/1986 | Ward | 55/25 |
| 4,685,941 | 8/1987 | Sato | 55/163 |
| 4,744,803 | 5/1988 | Knaebel | 55/25 |
| 4,756,723 | 7/1988 | Sircar | 55/25 |
| 4,758,252 | 7/1988 | Lerner et al. | 55/25 |
| 4,853,004 | 8/1989 | Kaplan et al. | 55/25 |
| 4,892,566 | 1/1990 | Bansal et al. | 55/26 |
| 4,892,569 | 1/1990 | Kojima | 55/163 |
| 4,931,071 | 6/1990 | Kaplan et al. | 55/25 |

OTHER PUBLICATIONS

H. Shin et al., "Pressure Swing Adsorption: A Theoretical Study of Diffusion-Induced Separations", *AIChE Journal*, Apr. 1987, vol. 33, No. 4, pp. 654–662.

*Primary Examiner*—Robert Spitzer
*Attorney, Agent, or Firm*—Coleman R. Reap; Larry R. Cassett

[57]     ABSTRACT

A process for producing a nitrogen-enriched product in improved yield and specific product comprising passing air through a bed of crushed zeolite having a particle size of 10 to 40 mesh, thereby adsorbing oxygen and producing the enriched nitrogen product.

8 Claims, 1 Drawing Sheet

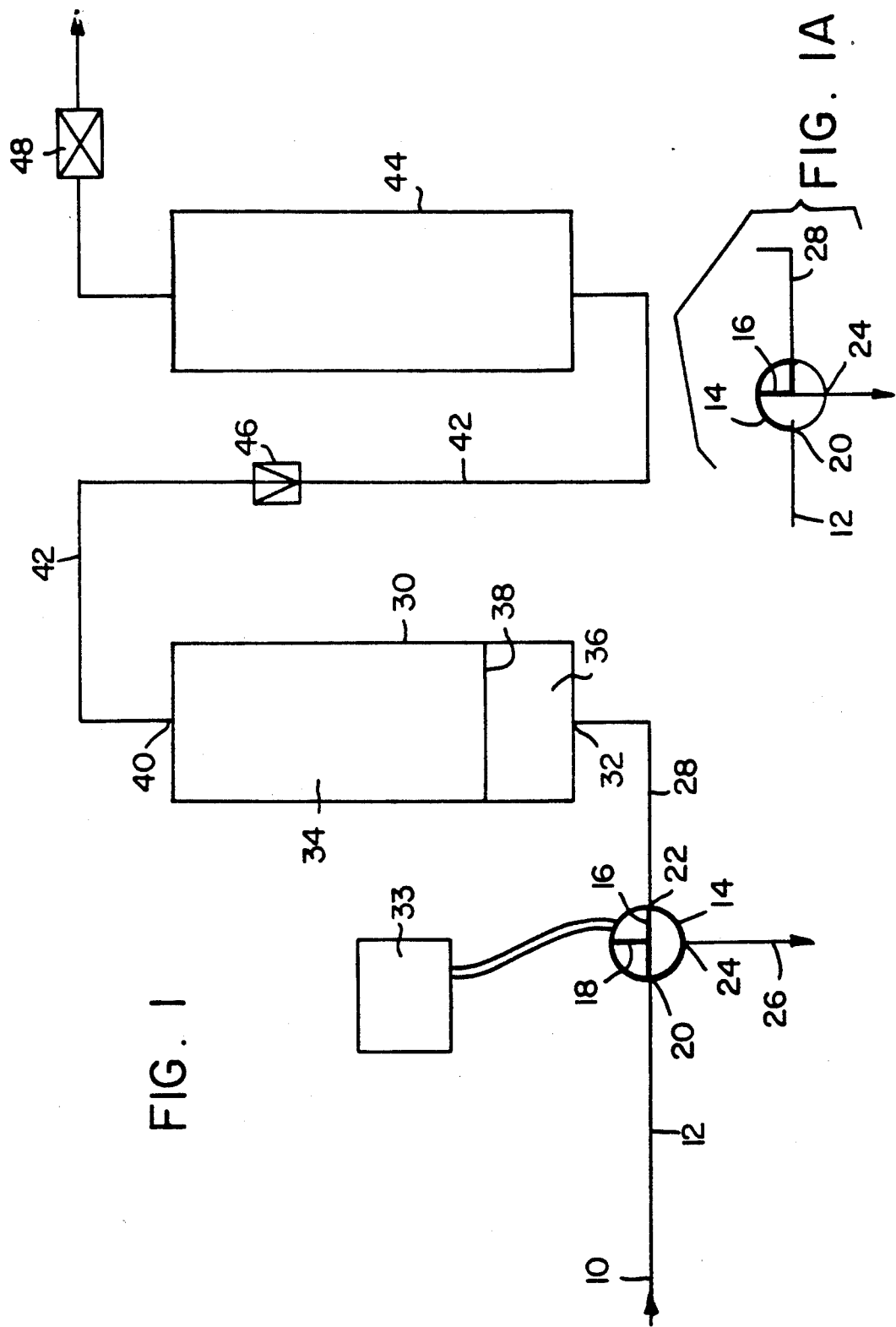

5,228,888

ECONOMICAL AIR SEPARATOR

RELATED APPLICATION

This application is a continuation-in-part of application Ser. No. 07/498,078, filed Mar. 23, 1990, now abandoned.

BACKGROUND OF THE INVENTION

This invention relates to an air separation system that is used to obtain a relatively pure stream of nitrogen from a feed stream of air under pressure in a pressure swing adsorption cycle.

There are, today, many methods and corresponding apparatus for carrying out the process of pressure swing adsorption or PSA. In the use of PSA technology, a stream of gas, normally air, is separated into one of its components by passing that air over a bed of adsorptive material.

Most systems include the use of two or more adsorption beds or columns and which are taken through various steps of pressurization, adsorption, depressurization and regeneration, in many sequences of steps. Such systems can be fairly complex in construction and operation and the associated timing steps, valve operation and sequencing can be considerably costly and difficult to construct. Typical examples of such systems include those shown and described in U.S. Pat. No. 3,086,339 Skarstom showing a three bed system, U.S. Pat. No. 3,891,411 with a two bed system and recently issued U.S. Pat. No. 4,892,566, Bansel et al utilizing a single bed system. Separation of nitrogen from air is also disclosed in the AICHE Journal, Apr. 1987, Vol. 33, No. 4, pages 654–662.

SUMMARY OF THE INVENTION

In accordance with the present invention, a low cost relatively simple air separation system is provided and which produces a nitrogen product stream from a feed stream of air under pressure and which product stream may include less than 2% oxygen.

The system comprises a single adsorption column containing a crushed kinetic zeolite sieve material. In the context of this disclosure, a kinetic zeolite is one that performs a separation by discriminating between components due to the difference of adsorption rates of each component. The intrinsic mechanism of such discrimination could be pore diffusivity, surface diffusivity, crystallite diffusivity, or surface adsorption kinetics. The zeolite covered in this disclosure adsorbs $N_2$ with a half time in the order of ten (10) seconds. Oxygen is adsorbed at a much faster rate.

The single adsorption column is charged with the air at a pressure in excess of 20 psig through a three way solenoid valve. The valve itself is a readily commercially available valve from a number of sources. A simple solid state electronic timer controls the valve position between a first position where the feed stream is delivered through the valve to the inlet of an adsorption column and a second position where the feed stream is blocked and the valve vents the inlet side of the adsorption column to atmosphere. A check valve is also provided in the outlet line from the adsorption column.

By the use of the crushed molecular sieve material, an extremely short duty cycle can be employed to alternatively deliver a nitrogen product stream from pressurized air passing through the adsorption column and to back flow the column to depressurize the same through its inlet.

All of the components of the present air separation system including the zeolite sieve material can be readily purchased from various commercial sources. Accordingly, a relatively compact air separator can be assembled and operated as a low cost, simple operation.

These and other advantages and features of the present invention will be more readily understood from the detailed description of the preferred embodiment set forth below taken in conjunction with the accompanying drawing.

BRIEF DESCRIPTION OF THE DRAWING

FIG. 1 is a schematic view of the overall process and equipment used in carrying out the subject invention; and FIG 1A is a schematic view of a portion of the FIG. 1 equipment with its solenoid valve in the alternate position.

DETAILED DESCRIPTION OF THE PREFERRED EMBODIMENT

Referring now to FIG. 1, there is shown a schematic of the process and apparatus for carrying out air separation by means of the present invention.

As shown in FIG. 1, an inlet 10 is provided to an inlet conduit 12 which receives the feed stream air. The air is under a predetermined pressure of between about 20 psig to about 100 psig and preferably at a pressure of about 60 psig. Due to the range of pressures, conduit 12 may be of relatively inexpensive polyvinyl chloride (PVC) pipe having a rupture pressure rating of at least 220 psig.

A three way solenoid valve 14 is provided at the downstream end of conduit 12 and has a through passage 16 and a radial passage 18 normal to the through passage 16. Solenoid valve 14 is electrically operated between two positions, the first of which is depicted in FIG. 1 and the second of which is depicted in FIG 1A, the purpose of which will be later explained.

Various, if not many, commercially available three way solenoid valves may be used, however, one typical valve is the Humphrey 125El solenoid valve operating on 240 volts AC and, for purposes of this description, its ports will be referred to as inlet port 20, outlet port 22 and vent port 24. As may be seen, the inlet conduit 12 is connected to inlet port 20 of solenoid valve 14 while vent port 24 is connected to a vent conduit 26 that is open at its end. The third port, outlet port 22 is connected to a further conduit 28 that joins that port to the adsorption column 30 by means of a column inlet 32.

An electronic timer 33 is used to control the position and sequence timing between the two positions of solenoid valve 14. The electronic timer 33 again, can be one of many commercially available timers, one that has been found suitable is a NCC Q6F-00060-321 timer available from National Controls Company.

Depending upon the source of pressurized feed air, a further tank may be employed upstream of the solenoid valve 14 to act as a reservoir to smooth out pressure fluctuate(ions in the feed air supply and to stabilize the pressure of the feed stream. That tank is not shown, however, a conventional commercially available reservoir tank may be used.

The adsorption column 30 is a standard column and, as will be shown in the example, a compact air separation system can use an adsorption column 30 having a capacity of about one liter. Within the adsorption column 30 is provided the sieve material 34.

The crushed sieve material is prepared from a kinetic zeolite, such as zeolite RS-10 or zeolite 4A, both of which are commercially available from UOP. The preferred crushed sieve material is crushed zeolite 4A. Other crushed kinetic zeolites may be used.

The sieve material used in the process of the invention is prepared by crushing kinetic zeolite to a particle size of about 10-40 mesh. If the zeolite has been activated by removal of moisture therefrom it is not necessary to reactivate the zeolite after crushing, provided that the crushing step is carried out under anhydrous conditions, for example by crushing the zeolite in a dry, inert gas atmosphere. However, it is not usually convenient to crush the zeolite under such conditions; accordingly it is preferred to carry out the crushing step under ordinary atmospheric conditions and subsequently reactivate the crushed zeolite. Activation can be conveniently effected by heating the crushed zeolite in an anhydrous inert gas atmosphere, such as an atmosphere of dry nitrogen. The level of activation will depend upon the amount of water removed from the crushed zeolite. It is preferred to heat the zeolite sufficiently long to drive off most or substantially all of the water contained therein. The temperature at which the crushed zeolite is heated is not critical, so long as it is sufficiently high to drive off moisture. Typical activation temperatures are those falling in the range of about 200° to 450° C. It is preferred to dry the crushed zeolite at a temperature in the range of about 300° to 400° C., since this accomplishes the drying in a relative short time with little or no damage to the crushed zeolite. Activation can also be effected by subjecting the crushed zeolite to a vacuum. The vacuum treatment can be carried out with or without heating the zeolite.

In the preferred embodiment, the adsorption column 30 is divided into two sections with about 90% containing the kinetic zeolite 34 with about 10% containing alumina 36 directly adjacent the column inlet 32. The alumina 36 is utilized to dry the incoming feed air in order to prevent moisture from contaminating the kinetic zeolite 34. A felt layer 38, in the order of 0.025 inches can be used to separate the kinetic zeolite 34 from the alumina 36. Alternatively, a wire screen or other separation may be used to isolate the alumina from the zeolite while allowing the flow of gas through the bed.

Obviously, while for compactness, it is preferred to include the alumina 36 within the adsorption column 30, its function is merely to dry the feed air and therefore other means of drying the air may be used, such as a separate dryer further upstream of the adsorption column 30 or there may be locations or supplies of pressurized air that is already sufficiently dry so as to not affect the zeolite.

A column outlet 40 is provided in adsorption column 30 and connects to outlet conduit 42 to a buffer or product reservoir 44 and again, the use of the product reservoir 44 is merely to smooth out surges of flow and/or pressure fluctuations to provide a product stream of relatively constant flow and pressure.

A check valve 46 is provided in outlet conduit 42 downstream from column outlet 40 and prevents the flow of gas in a reverse direction, that is, toward the column outlet 40.

As a further component, a pressure regulator or valve 48 is used downstream of the product reservoir 44 to provide a gas to the end user at the desired conditions.

The operation of the compact air separation unit is thus as follows. The adsorption column 30 is pressurized by the feed air enter inlet conduit 12 via inlet 10. The electronic timer 33 positioned the solenoid valve 14 in its position shown in FIG. 1 such that the feed air passes directly through solenoid valve 14 by through passage 16 and enters and passes through the adsorption column 30 via its column inlet 32 and column outlet 40 respectively. The pressure of the air feed may be within the range of from about 20 psig to about 100 psig with a preferred pressure of about 60 psig.

During passage through adsorption column 30, the oxygen is, of course, separated from the air stream and the product entering outlet conduit 42 is almost entirely nitrogen. That product nitrogen thereupon passes through the check valve 46 and accumulates within product reservoir 44 before being transported to its end use through regulator 48.

After a predetermined extremely short cycle of the feed air passing through adsorption column 30, the electronic timer 34. signals solenoid valve 14 thereby changing its position to that shown in FIG 1A. In the FIG 1A position of the solenoid valve 14, the feed stream is cut off since the inlet conduit dead ends at inlet 20 of solenoid valve 14. Meanwhile, the residual pressure and feed air within adsorption column 30 is vented to atmosphere since the outlet 22 of solenoid valve 14 is open to the vent conduit 26 through passage 16 and a section of through passage 16. Since check valve 46 prevents product nitrogen contained within product reservoir 44 from flowing in a reverse direction back into the adsorption column 30, that adsorption column 30 undergoes depressurization and a reverse flow of feed air remaining therein progresses toward and out of vent conduit 26, thus returning adsorption column 30 to atmosphere pressure.

At the end of second predetermined time period, electronic timer 33 signals solenoid valve 14 and solenoid valve 14 returns to its position depicted in FIG. 1 to again commence the introduction of feed air into the adsorption column to produce nitrogen product stream.

The timing cycle is relatively critical in operation of the present air separation system in that the product cycle, that is where the solenoid valve 14 is in the FIG. 1 position, and the vent cycle, where the solenoid valve 14 is in the FIG. 1A position, must be relatively rapid.

The product cycle time is preferably about 4 seconds to 15 seconds. Continuing the product cycle beyond about 15 seconds results in oxygen leaving the adsorption column into the outlet conduit 42. The preferred time for the product cycle is about 10 seconds. The vent cycle is also relatively rapid and preferably is from 4 seconds to 15 seconds, however, it is obviously less critical than the product cycle since its function is to vent the adsorption column 30 and create a reverse flow of air and partially separated air out the vent conduit 26.

It is preferred for cycle efficiency that the vent cycle be about the same time as the product cycle time, that is from 4 to 15 seconds and preferably about 10 seconds.

The simplicity and compactness of the separation system is exemplified by the lack of a need for a separate pressurization cycle or purge cycle, typically used in various PSA systems.

The product cycle time is so rapid that the pressure builds up almost immediately merely by the pressure of the feed air and depressurization is also rapidly accomplished.

The invention is further illustrated in the following examples in which parts, percentages and ratios are expressed on a volume basis, unless otherwise indicated.

EXAMPLE I

A sample of commercial grade 4A zeolite molecular sieve 1/16" pellets), sold by Union Carbide Company, was crushed to a particle size of 10–40 mesh in a laboratory grinder and sifted in a mechanical sifter fitted with 10 mesh and 40 mesh screens. The sifted particles were activated by heating in an oven in the presence of a nitrogen atmosphere for several hours at a temperature of about 350° C.

A 1 liter cylindrical adsorption chamber was packed with a layer of alumina and then with a layer of the 10–40 mesh crushed 4A molecular sieve. A series of runs was conducted in which four nitrogen-enriched gas streams of different nitrogen purities were produced by passing air through the adsorption chamber in such a manner that the air passed first through the layer of alumina and then through the layer of zeolite. The nitrogen purities, defined in terms of percent oxygen impurity contained in the product stream, are listed in the Table set forth below. Each run was conducted for a period of at least two hours, during which the adsorption/regeneration cycle comprised pressurization-production for 10 seconds and atmospheric venting for 10 seconds. The product purity was measured by a fuel cell oxygen analyzer, and the feed and product gas flow rates were measured by a fuel cell oxygen analyzer, and the feed and product gas flow rates were measured by mass flow meters. The resulting yield and specific products, calculated from the product purity and feed and product gas flow measurements, are reported in the Table.

EXAMPLE II

The experiment of Example I was repeated, except that the 1 liter adsorption bed was packed with a layer of alumina and the 4A zeolite molecular sieve pellets, as received, i.e. uncrushed. The results of this experiment are reported in the Table.

TABLE

| Product Purity, % $O_2$ | Yield % [1] | | | Specific Product [2] | | |
|---|---|---|---|---|---|---|
| | Uncrushed 4A | Crushed 4A | Percent Increase | Uncrushed 4A | Crushed 4A | Percent Increase |
| 0.4 | 6.1 | 8.7 | 43 | 84 | 128 | 52 |
| 0.6 | 6.6 | 10.1 | 53 | 93 | 150 | 61 |
| 0.9 | 7.3 | 12.2 | 67 | 104 | 181 | 74 |
| 1.0 | 7.5 | 12.8 | 71 | 108 | 190 | 76 |

[1] Yield = $\frac{\text{Nitrogen produced}}{\text{Nitrogen fed}}$

[2] Specific Product = $\frac{\text{Std. liters}}{\text{liter sieve} - \text{hour}}$ The results reported in the Table show that the increase in the yield of nitrogen produced when crushed 4A zeolite is used in place of uncrushed 4A zeolite varies from a 43% increase when the nitrogen product contains 0.4% oxygen to a 71% increase when the nitrogen product contains 1% oxygen.

The Table also shows that the percentage increase of specific product varies from 52% when the nitrogen product contains 0.4% oxygen to 76% when the nitrogen product contains 1% oxygen.

We claim:

1. A process for producing a nitrogen-enriched product in an adsorption bed having an inlet and an outlet, said bed comprising activated kinetic zeolite crushed to a particle size of about 10 to 40 mesh comprising the steps of:
   (a) introducing air at a pressure of about 20 to about 100 psig into said bed through said inlet for a period of about 4 to 15 seconds while withdrawing nitrogen enriched product from said bed through said outlet,
   (b) venting said bed through said inlet for a period of about 4 to about 15 seconds while blocking the flow of air to the bed and preventing nitrogen from reverse flowing to the bed through said outlet, and
   (c) repeating steps (a) and (b).

2. The process of claim 1, wherein the pressure of the feed air is in the range of about 30 psig to about 80 psig.

3. The process of claim 1, wherein the pressure of the feed air is about 60 psig.

4. The process of claim 3, wherein steps (a) and (b) are each carried out for about seven seconds.

5. The process of claim 1, wherein steps (a) and (b) are effected by means of a two position valve located in said inlet.

6. The process of claim 5, wherein steps (a) and (b) are carried out for about equal time periods.

7. The process of claim 6, wherein said time periods are each about ten seconds.

8. The process of claim 1, wherein the feed air passes through a water adsorbent material prior to entering said bed.

* * * * *